April 9, 1968 J. A. POTTER 3,377,472

LOGIC CIRCUIT SWITCHING BY INTERCONNECTED SERIES OF ELECTRICAL LATCHES

Original Filed Sept. 13, 1962 8 Sheets-Sheet 1

INVENTOR
James A. Potter
BY John R. Ewbank
ATTORNEY

INVENTOR
James A. Potter
BY John R. Ewbank
ATTORNEY

INVENTOR
James A. Potter
BY John R. Ewbank
ATTORNEY

INVENTOR
James A. Potter
BY John R. Ewbank
ATTORNEY

INVENTOR
James A. Potter
BY John R. Ewbank
ATTORNEY

INVENTOR
James A. Potter
BY John R. Ewbank
ATTORNEY

INVENTOR
James A. Potter
BY John R. Ewbank
ATTORNEY

INVENTOR
James A. Potter
BY John R. Ewbank
ATTORNEY

United States Patent Office 3,377,472
Patented Apr. 9, 1968

3,377,472

LOGIC CIRCUIT SWITCHING BY INTERCONNECTED SERIES OF ELECTRICAL LATCHES

James Addison Potter, 81 Rumford St., West Hartford, Conn. 06107

Continuation of application Ser. No. 223,427, Sept. 13, 1962. This application Mar. 30, 1966, Ser. No. 538,867
1 Claim. (Cl. 235—152)

ABSTRACT OF THE DISCLOSURE

Automatic weighing systems, computers and other apparatus featuring logic circuits employing switching actuated by a series of electrical latches so arranged that searching for incremental values always begins with the least unit. Such least-next searching of the logic circuit is also applicable in hydraulic, mechanical or other non-electrical systems.

This is a continuation of Ser. No. 223,427, filed Sept. 13, 1962, and now abandoned.

This invention relates to methods and apparatus for measuring, computing, indicating, and controlling variables such as variable magnitudes of electrical, fluid, and mechanical quantities.

Heretofore some servo mechanisms have been designed to maximize the stability of the system, thus resisting the tendency of feedback signals to overcompensate for momentary surges of adverse condition. However, in achieving stability in a servosystem, considerable sacrifices of speed of response have generally been necessary. In order to obtain a favorable balance of stability and speed of response in a servosystem, it has generally been necessary to use equipment involving a sizeable investment. There has been a long standing demand for less expensive approaches toward achieving servosystems characterized by both reasonable speed and reasonable stability.

Heretofore computers, instrumentation, servo-mechanisms, and related devices have utilized digital operations, analog operations, and various combinations of analog and digital operations. Converters suitable for converting analog to digital data have heretofore been sufficiently expensive that engineers have been reluctant to use such converters except for the more costly installations. Engineers have been accustomed to employing analog operational amplifiers in a variety of situations, and have long demanded that there be converters to digital data having the simplicity and cost and flexibility of usefulness of analog operational amplifiers.

In accordance with the present invention, an associated series of least-next elements is employed to accomplish the many functions which heretofore either have been achieved by relatively expensive apparatus or have been unfulfilled. In providing a subsystem as flexible, versatile, and universally applicable as an analog operational amplifier, but adapted sometimes also to serve as a converter to digital signals, and/or to transmit feedback signals with the combination of speed and reasonable stability, and/or to measure variations of the input signals, the invention is applicable to computers, instrumentation, servo-mechanisms, and to many other installations. In accordance with the present invention, after the system has achieved and maintained quiescence, and is subjected to an incremental signal urging a change, it is not necessary for the system to start from an all zero arrangement, but instead the existing arrangement is modified by advancing only so far along a predetermined series (ordinarily in their order of ascending magnitudes, following any of a variety of number systems, but preferably utilizing the multiple radix numerical systems described in my application Ser. No. 55,847, filed Sept. 14, 1960, which through a continuation issued as Patent 3,211,991 on Oct. 12, 1965, but in whatever order best promotes the desired balance of speed, stability, and cost in the system) as is necessary to obtain some measurement of the incremental change. The term "least-next" focuses attention upon this successive searching of only enough of a series to adapt to the increment. Even if the thus made measurement is sufficiently inaccurate to stimulate an overcompensation or undercompensation, the ease and speed with which the system can measure one or more additional incremental signals to readjust from an existing arrangement are sufficiently great to make the use of the least-next units of the present invention economically attractive. Although applicable to many systems, the invention can be understood in connection with electrical weighing apparatus suitable for measuring a weight which may remain constant for awhile, or which may vary widely. Such illustrative system includes a display of about 5 digits representing the arabic numerals from 0 to 99,999, Indicating constantly the varying weight being measured. Industrial users of electrical weighing devices have hoped for apparatus having an accuracy and precision to about 10 parts per million throughout a wide range of weights. Electrical weighing apparatus may include a servo-mechanism for inserting or withdrawing electrical resistances to electrically balance the resistance of the strain gauge or gauges employed for detecting the weight. Each change of weight from a previous weight provides an incremental change of electrical resistance, providing a signal of incremental voltage, and by the present invention, this varying incremental voltage is converted to digital signals actuating the display of arabic numerals by the utilization of least-next units, instread of making each weighing by starting from zero to search for the correct combination. The use of the least-next units permits the scanning and searching to begin from an existing situation, and to modify the existing situation to the extent necessary to measure, indicate, etc. the net weight including the recent increment. A typical least-next unit may advantageously include components such as two binary inputs, a delay unit for each input, a latch-unlatch component, a pair of outputs from the latch, a pair of summation units summing the output from the latch and the corresponding input to the least-next unit; each summation unit providing an output corresponding to its input but contingently upon the position of the latch; whereby increments of less than a predetermined magnitude and/or shorter than the predetermined delay fail to advance to one of the two corresponding outputs and/or fail to actuate the latch.

The accompanying drawings further clarify and illustrate a few of the possible form of the invention.

Figure 3:
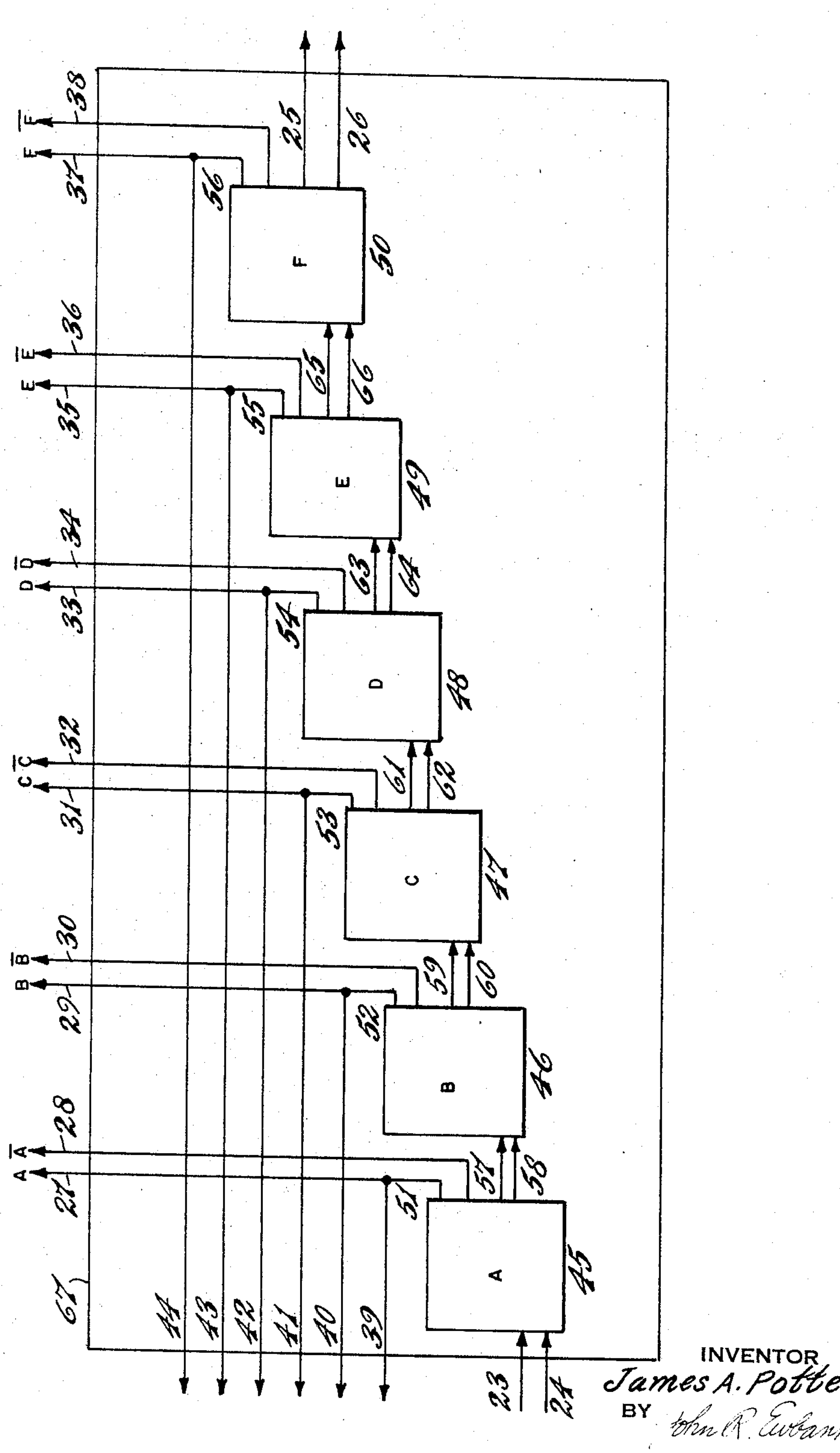
FIGURE 3 is a block diagram illustrating the use of a plurality of my least-next logic elements to comprise a module suitable for use in systems in accordance with the principle of my invention.
Figure 5:
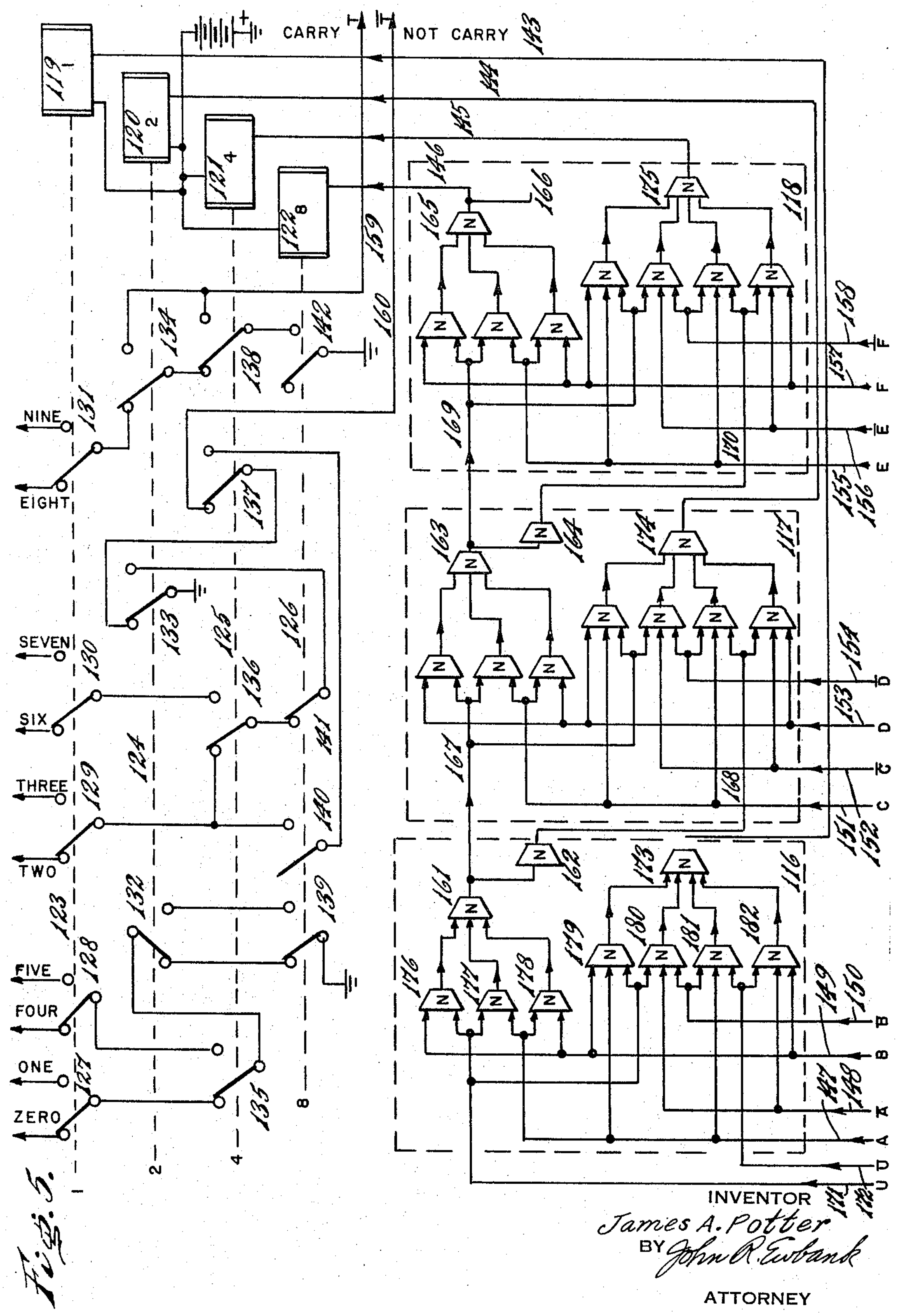

FIG. 5 is a diagram illustrating a typical translator adapted to receive the coded signals in logic module of FIG. 3 and to translate them into decimal signals. Four electromagnetic relays are indicated in the schematic circuit at the upper part of FIG. 5. The lower part of FIG. 5 is a logic diagram containing twenty-nine NOR elements.

Figure 6:
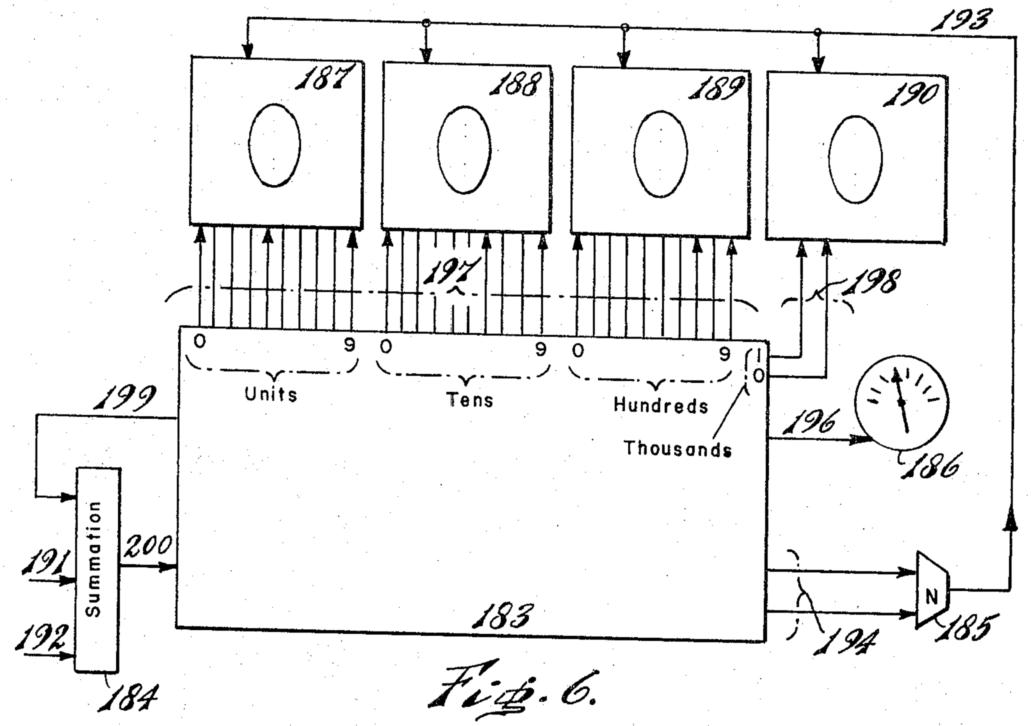

FIG. 6 is a block diagram of a typical measuring and computing system constructed in accordance with my invention so as to measure an independent variable and add it to another input.

Figure 7:
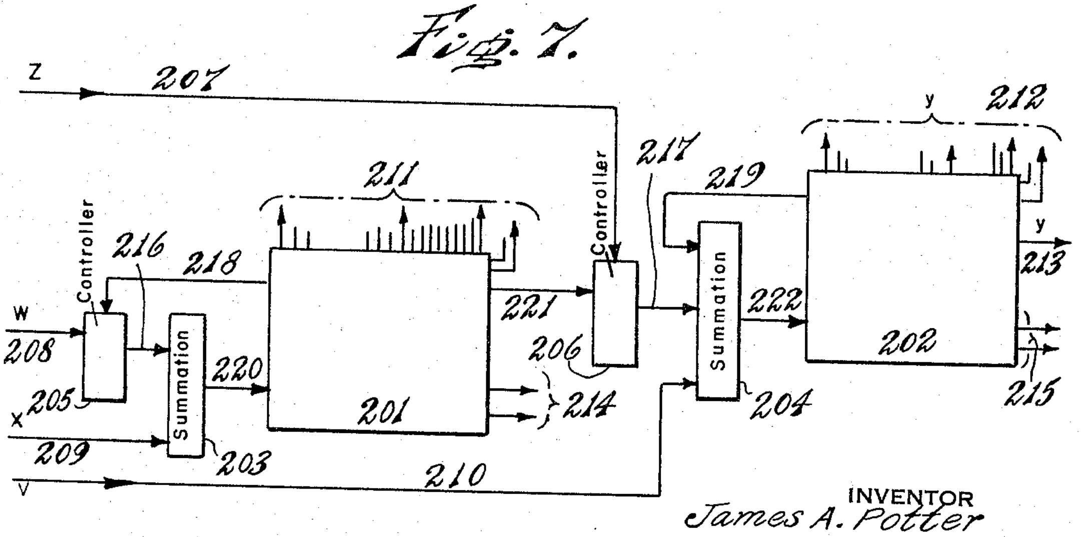

FIG. 7 is a block diagram illustrating a computing system constructed in accordance with my invention.

Figure 8:
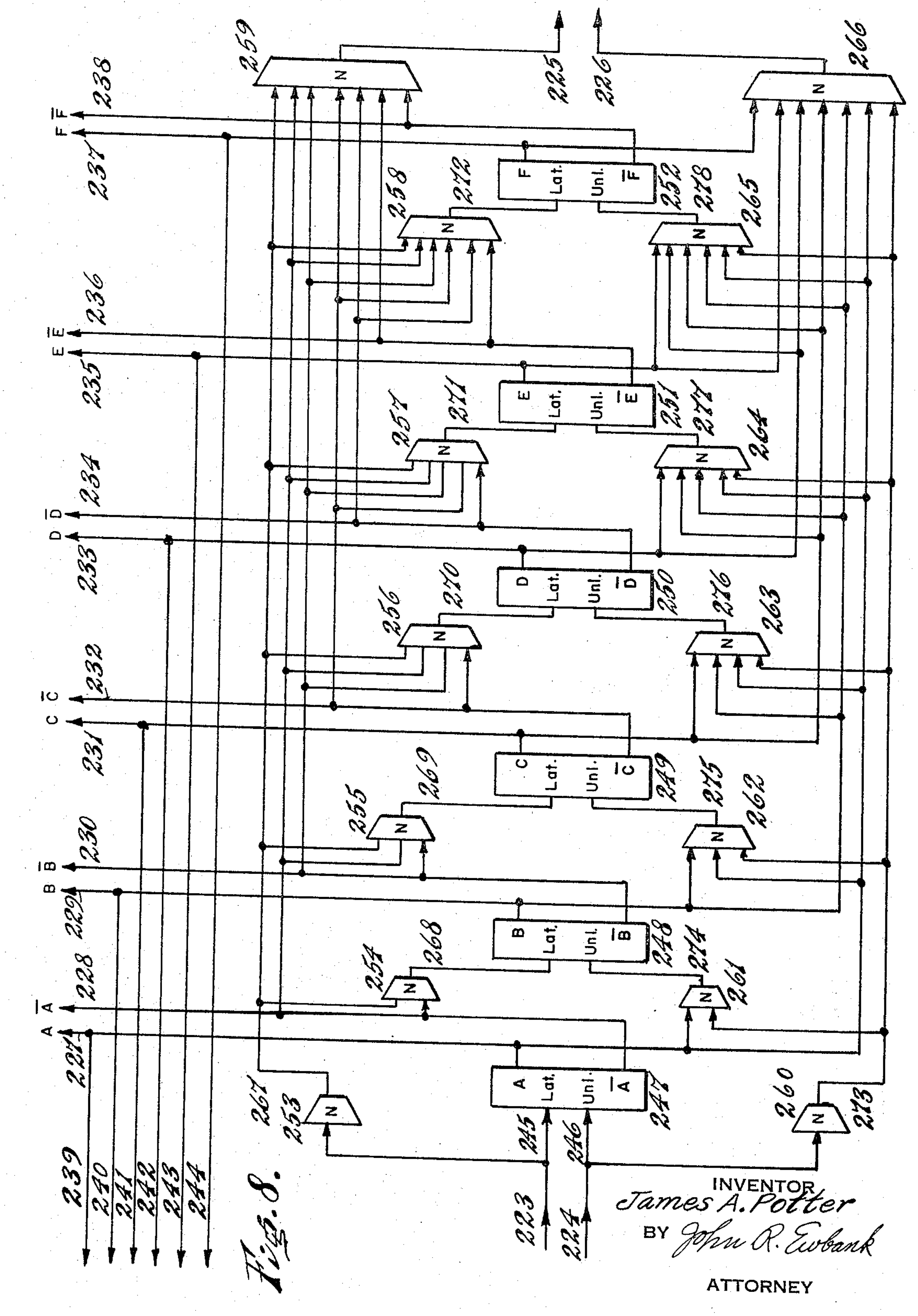

FIG. 8 is a logic diagram of a least-next module in accordance with my invention to provide a preferred embodiment containing NOR and LATCH logic elements only.

Figure 9:
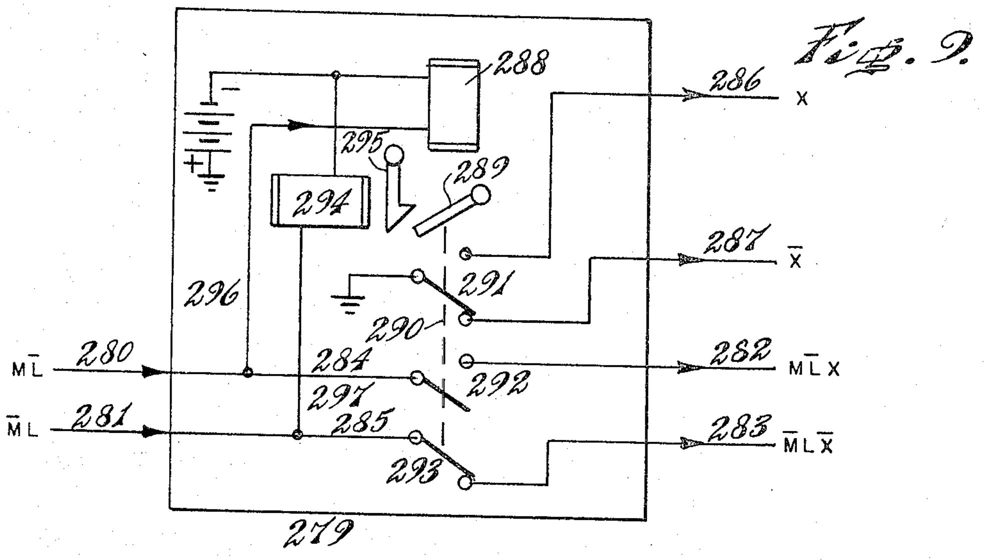

FIG. 9 is a circuit schematic of an embodiment of a least-next element utilizing electro-mechanical parts, such as relays.

Figure 10:
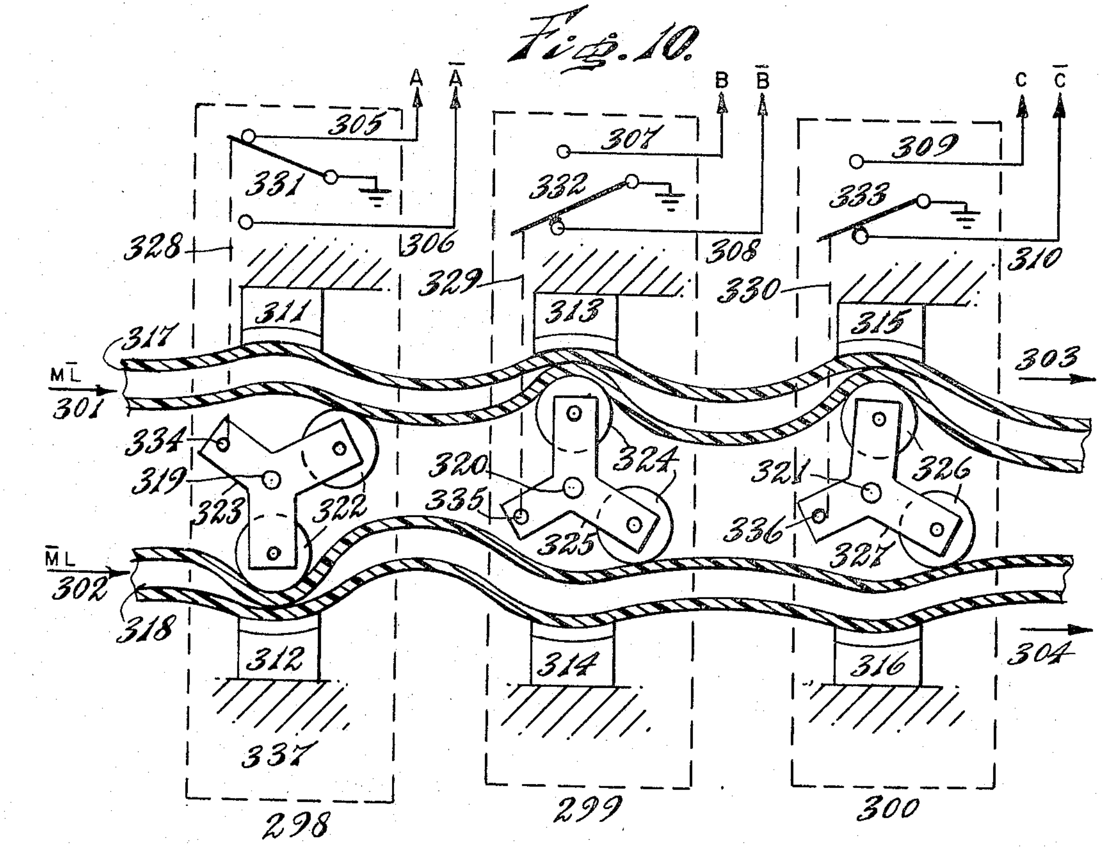

FIG. 10 is a schematic diagram showing three least-next elements actuated by fluid flow.

Figures 11, 12, 13:
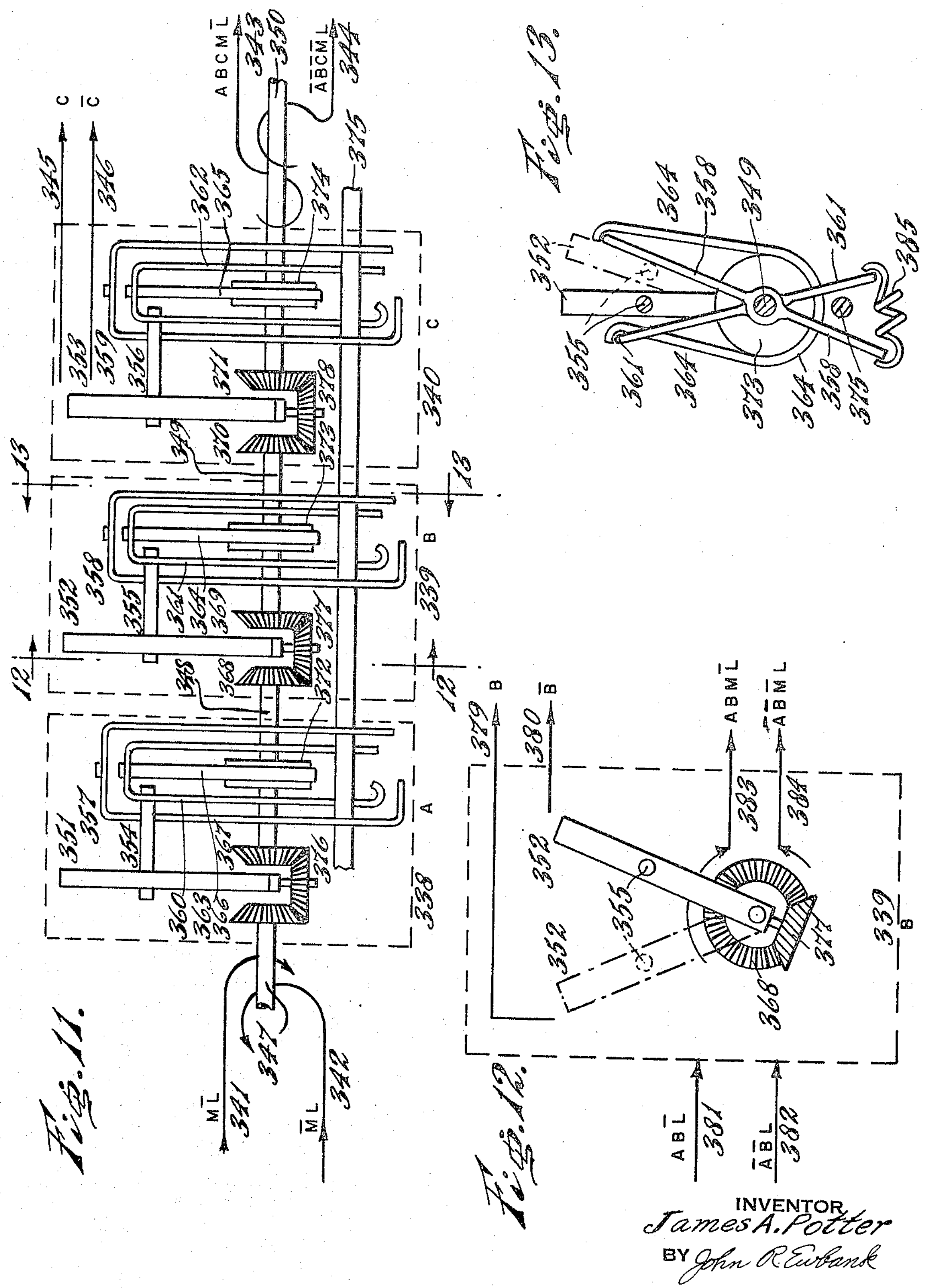

FIG. 11 is a side view of a partial assembly of three least-next modules actuated by mechanical movement.

FIG. 12 is a partial vertical sectional view taken on the lines 12—12 in FIG. 11.

FIG. 13 is a partial vertical sectional view taken on the lines 13—13 in FIG. 11.

For the sake of clarity, the various features of my invention are described under headings, as follows:

*Symbolic logic*

Capital letters are used throughout this specification, drawings, and description to denote binary variables. Because various authorities on symbolic logic differ in their selection of notation for the fundamental logical operations, the following definitions are given for use in this description:

The expression ABCDE means A and B and C and D and E.

The expression $A+B+C+D$ means A or B or C or D.

The expression $\overline{A}$ means not A.

The expression $A\overline{B}C\overline{D}$ means A and not B and C and not D.

The expression $\overline{A}+B+\overline{C}$ means not A or B or not C.

Figure 1:
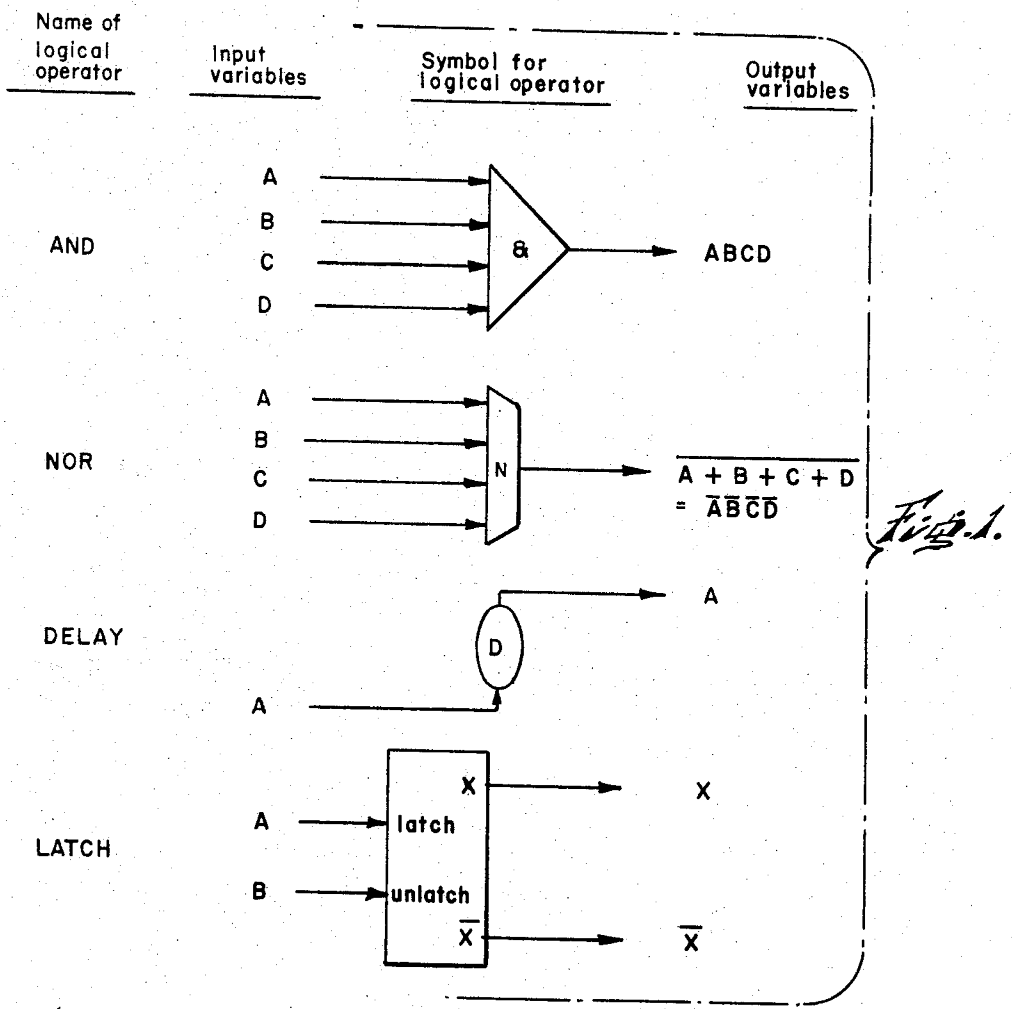
FIG. 1 is a legend of logic symbols in FIGS. 2, 5, and 8.

The logical operators for binary variables which are in common useage and which are employed in my invention are listed in legend form in FIG. 1.

*The least-next logic element*

Figure 2:
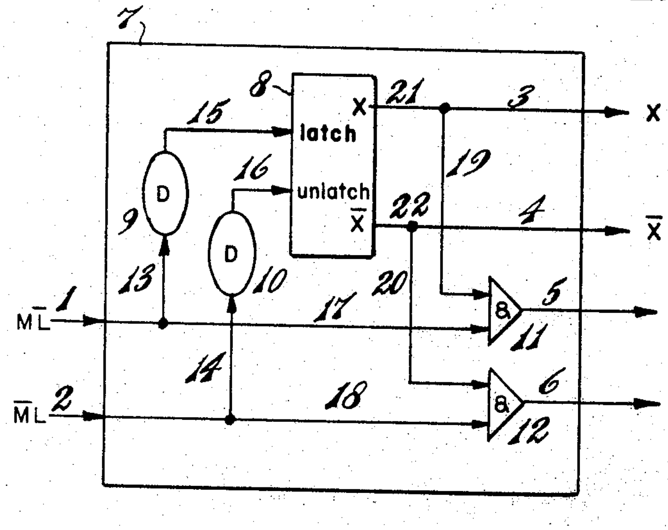
FIG. 2 is a logic diagram of the least next logic element of my invention.

The outline 7 in FIG. 2 contains the logic diagram for the least-next logic element of my invention. The element 7 accommodates two binary inputs. One input appears at line 1, and the other input appears at line 2. The binary outputs of the least-next logic element 7 appear at lines 3, 4, 5, and 6. The logical operators comprising the element 7 are LATCH 8, DELAYs 9 and 10, and ANDs 11 and 12. The functioning of each of the DELAYs 9 and 10 is such that the binary state appearing at DELAY inputs 13 and 14 will appear at DELAY outputs 15 and 16, respectively; but any change of state of a DELAY input will cause the corresponding change in DELAY output after a time delay. The duration of the time delay can be any finite value without affecting the logical description of my invention.

The AND operator 11 accepts binary inputs 17 and 19 and provides binary output 5, which is one of the outputs of the element 7. The binary variable 5 may assume one of two states, namely: ONE and ZERO. AND operator 11 causes the ONE state to appear on output line 5 only when both of its input lines 17 and 19 are in their ONE states; and causes the ZERO state to appear on line 5 for any other combination of input states of lines 17 and 19.

The latch operator 8 accepts binary inputs 15 and 16 and provides binary output variables 21 and 22. A feature of the LATCH 8 is that whenever output 21 is ONE, output 22 is ZERO; and, conversely, whenever output 21 is ZERO, output 22 is ONE. Another feature of LATCH 8 is that its outputs will not change in state while both inputs 15 and 16 are in their ONE states, nor while both inputs 15 and 16 are in their ZERO states. Another property of the LATCH 8 is that the ONE state appearing on input 15 produces the ONE state on output 21, and the ZERO state on output 22, which combination is termed the LATCHED state of LATCH 8. In the event the ONE signal at input 15 arrives at a time when outputs 21 and 22 are already in their LATCHED states, no change will occur. Another property of the LATCH 8 is the ONE state appearing on the input 16 produces the ONE state on output 22 and the ZERO state on output 21, which combination of outputs is termed the UNLATCHED state of the LATCH 8. In the event the ONE signal at input 16 arrives at a time when outputs 21 and 22 are already in their UNLATCHED states, no change will occur.

The input variables of least-next logic element 7 are supplied to the DELAYs and the AND's by the branching of line 1 into lines 13 and 17; and by branching line 2 into lines 14 and 17. The outputs of the LATCH 8 are branched to furnish inputs to the AND's, as well as to become the outputs of the element 7. Line 21 feeds lines 3 and 19, while line 22 feeds lines 4 and 20.

The operation of least-next logic element 7 of FIG. 2 merits attention. Assume for the moment that LATCH 8 is LATCHED, and that both inputs 1 and 2 are in their ZERO states. Under the combination of states just assumed, the outputs 5 and 6 will both be in their ZERO states; output 3 will be ONE, and output 4 will be ZERO. Under these conditions, repeated cycles of variations of input 1 from its ZERO state to its ONE state and back again will cause no change in the states of outputs 3, 4, and 6. However, output 5 will follow the changes in state of input 1 by assuming states identical to the states of input 1. This "slaving" of the states of output 5 to the states of input 1 occurs without any delay; but it prevails only so long as LATCH 8 remains LATCHED.

The operation of element 7 under another set of circumstances merits attention. Next, assume that the cycles of variations on line 1 subside, and it maintains the state of ZERO. Assume that input 2 undergoes variations from ZERO to ONE: At the first instant the ONE appears at input 2, it will be distributed to input 14 of DELAY 1; and to input 18 of AND 12. Of importance, no change in the outputs of element 7 will occur immediately because of the delaying action of DELAY 10; and if the input condition of line 2 becomes ZERO again before the delay time designed into DELAY 10 elapses, there will be no change thereafter in those outputs. However, if the ONE state of input 2 persists long enough for the delay time of DELAY 10 to expire, line 16 will be driven to its ONE state and cause the UNLATCHING of LATCH 8. Outputs 3 and 4 then immediately assume their ZERO and ONE states, respectively; and the ONE state immediately appears on input 20 to AND operator 12. Under these new conditions caused by the UNLATCHING of LATCH 8 the output line 6 will follow without delay in a "slaving" manner the input states of input 2.

The notations $M\overline{L}$ at line 1 and $\overline{M}L$ at line 2 in FIG. 2 denote a variable demand for changes in magnitudes of the states of output variables 3 and 4. When no demand for change is present, both $M\overline{L}$ and $\overline{M}L$ are at ZERO, and impose the ZERO states upon inputs 1 and 2. The variable M is a demand for MORE in its ONE state; and the variable L is a demand for LESS in its ONE state. Outputs 5 and 6 furnish demands for change in magnitude when a demand for change persists after the change in state of outputs 3 and 4 has been made in the sense demanded by the states of inputs 1 and 2. For output 5 the notation in logic expressing this variable is $M\overline{L}X$, which can be read as "MORE and not LESS and X." This is a short notation which signifies that a demand for increased magnitude will appear on line 5 only whenever there is a demand for increase at the input of element 7, and the LATCH in element 7 is LATCHED.

≡

Similarly, the expression $ML\overline{X}$ at line 5 is read "not MORE and LESS and not X," which means that a demand for decrease in magnitude will appear on line 6 whenever there is a demand for decrease at the input of element 7 and the LATCH in element 7 is UNLATCHED.

*The least-next module*

FIG. 3 is a preferred embodiment of my invention wherein a plurality of the elements 7 in FIG. 2 are interconnected to give gradations of magnitude in response to demands for change in magnitude. Demand for change of magnitude is made at the input of the lowest-numbered of the elements, and the demands passed on to the higher-numbered elements in accordance with my invention. The term "least-next" is used to denote the feature of my invention whereby the element which changes its state is the lowest-numbered of those elements not already in the state representing the farthest they can go in the sense of magnitude change demanded. In FIG. 3 outline 67 contains a least-next module. Binary variables appearing at input lines 23 and 24 furnish the demands for magnitude changes. Output lines pass binary variables of demand for magnitude change along to succeeding modules. Outputs 27 to 38, inclusive, furnish indications of the states of the variables A to $\overline{F}$, inclusive, respectively. Outputs 39 to 44, inclusive, are multiple outputs of 27, 29, 31, 33, 35, and 37, respectively. Least-next logic elements 45 to 50, inclusive, are simplified diagrams of element 7 in FIG. 2, and are identified with logical variable designations A to F, inclusive, respectively. Lines 57 to 66, indicate the connection, in accordance with my invention, of the outputs of the least-next elements as inputs to the next-in-sequence element.

Whenever both of the binary variables 23 and 24 are in their ZERO states, all of the elements 45 to 50, inclusive, will remain quiescent in whatever states the disappearance of the last demand signal left them. In such a quiescent state the pairs of output leads 27:28 to 37:38, inclusive, furnish a readout which can be used in the manner of a binary number of six binary bits. These outputs, as well as outputs 39 to 44, inclusive, can also be used to provide indications and control signals in various kinds of measurement, computing and control devices in embodiments of my invention wherein the outputs 27 to 44, inclusive, do not represent binary numbers, but represent simply the values assigned to the elements 45 to 50, inclusive. In other cases these elements may have no values at all assigned, but would be useful in some applications simply as logic devices in a series sequence.

The relationships of the various binary variable represented in FIG. 3 are given in the notation of symbolic logic, as follows:

| Reference numeral in Fig. 3 | Expression in symbolic logic | Reference numeral in Fig. 3 | Expression in symbolic logic |
|---|---|---|---|
| 23 | $M\overline{L}$ | 24 | $\overline{M}L$ |
| 57 | $A\overline{M}\overline{L}$ | 58 | $\overline{A}ML$ |
| 59 | $ABM\overline{L}$ | 60 | $\overline{A}B\overline{M}L$ |
| 61 | $ABCM\overline{L}$ | 62 | $\overline{A}B\overline{C}\overline{M}L$ |
| 63 | $ABCDM\overline{L}$ | 64 | $\overline{A}\overline{B}\overline{C}\overline{D}\overline{M}L$ |
| 65 | $ABCDEM\overline{L}$ | 66 | $\overline{A}\overline{B}\overline{C}\overline{D}\overline{E}\overline{M}L$ |
| 25 | $ABCDEFM\overline{L}$ | 26 | $\overline{A}B\overline{C}\overline{D}EF\overline{M}L$ |
| 51, 27, 39 | A | 28 | $\overline{A}$ |
| 52, 29, 40 | B | 30 | $\overline{B}$ |
| 53, 31, 41 | C | 32 | $\overline{C}$ |
| 54, 33, 42 | D | 34 | $\overline{D}$ |
| 55, 35, 43 | E | 36 | $\overline{E}$ |
| 56, 37, 44 | F | 38 | $\overline{F}$ |

In a preferred embodiment of my invention, numerical values are assigned to elements 45 to 50 inclusive, and the values assigned have magnitudes ascending in the same order as the progression of their referenced numerals. The increments of increase from value to value need not be uniform nor have any systematic relationship to each other. However, the most useful progressions utilize a multiple radix numeral system.

It is a fundamental feature of my invention that the smallest available magnitude of change will be effected upon a demand for magnitude change. It is contemplated that my invention can be used most effectively in systems containing electronic, electro-mechanical, hydraulic, pneumatic, or mechanical devices.

*The least-next sub-system*

Figure 4:
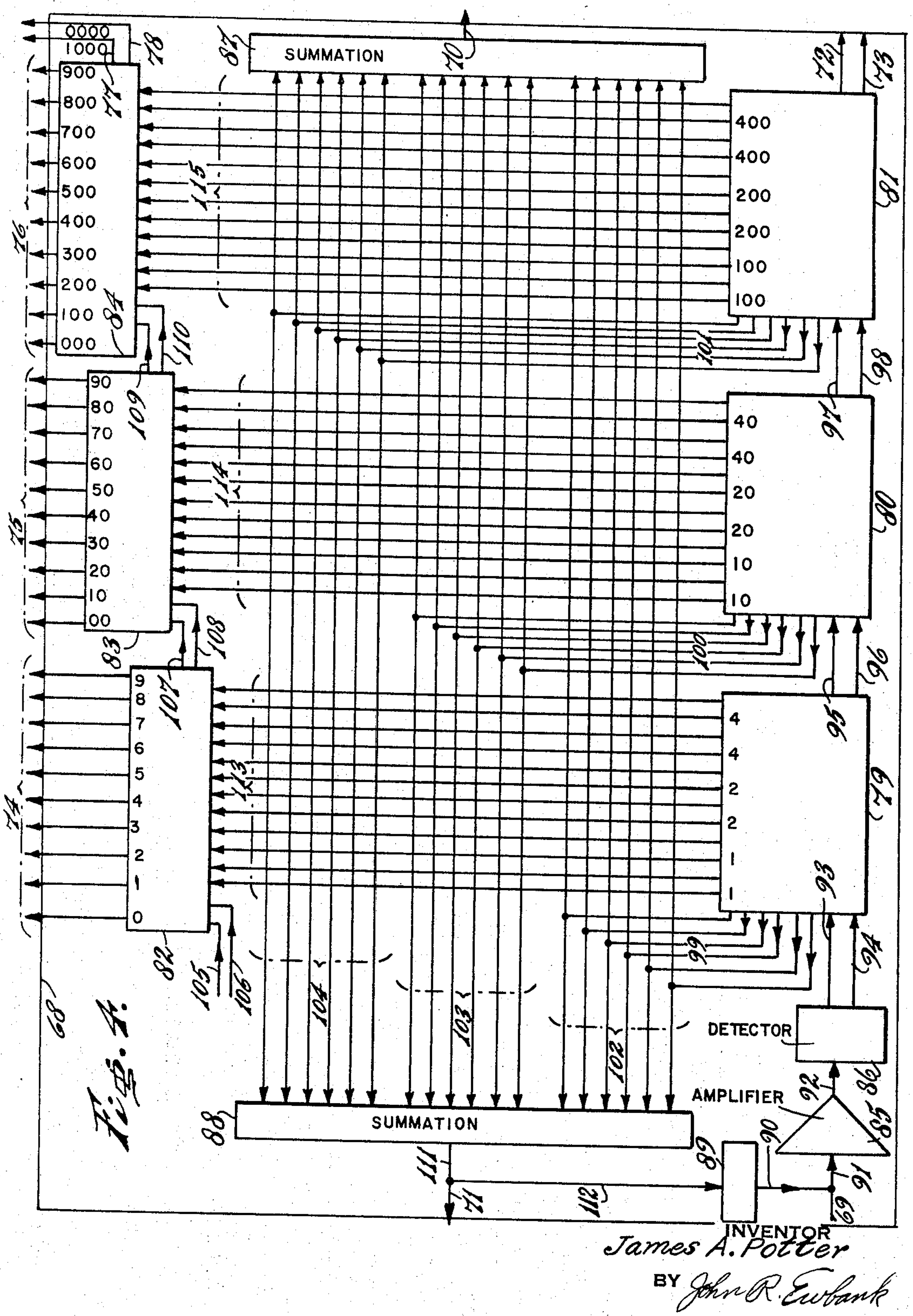
FIG. 4 is a block diagram of a typical sub-system of my invention.

The preferred embodiment of features of my invention is shown in the block diagram of FIG. 4, in which outline 68 encloses the least-next sub-system. An incrementally variable quantity 69 is the single signal input to the sub-system 68. Two incrementally variable outputs, 70 and 71, are characteristic of the sub-system. Output 70 is useful as a feed-forward variable to other sub-systems; and output 71 is useful as a feed-back variable to other devices.

Symbols 79, 80, and 81 each indicate a least-next module of the kind shown as item 67 in FIG. 3. The outputs of module 81 which transmit magnitude change demand signals, that is, lines 72 and 73, are also binary variable outputs for the sub-system 68. Demand signals from module 79 are transmitted to module 80 by way of binary variable on lines 95 and 96; and lines 97 and 98 provide a transmission path for the same connection between modules 80 and 81.

Reference numerals 82, 83, and 84 identify translators which serve to translate the binary variables 113, 114, and 115, which are outputs of modules 79, 80, and 81, respectively, into decimal output signals transmitted over the groups of lines designated 74, 75, and 76, respectively. Lines 77 and 78 are additional output signals of sub-system 68, and are part of the decimal output signals. The translators 82, 83, and 84 provide a preferred feature of my invention in converting the preferred binary arrangement of the internal logic of my invention into decimal signals useful for perception by human persons. More information about the translators is discussed in connection with FIG. 5.

In FIG. 4, input leads 105 and 106 to translator 82 do not function as part of the system described for FIG. 4, and are shown only to complete the uniform translator symbol. Binary variables transmitting CARRY signals are as follows:

Line 107 transmits CARRY TEN; line 108 transmits NOT CARRY TEN.

Line 109 transmits CARRY ONE HUNDRED; 110 transmits NOT CARRY ONE HUNDRED.

LINE 77 transmits CARRY ONE THOUSAND; 78 transmits NOT CARRY ONE THOUSAND.

Binary variables 102, 103, and 104 are energized by outputs 99, 100 and 101, respectively, of modules 79, 80, and 81, respectively and are the inputs for both of the summing devices 87 and 88. The summing devices 87 and 88 energize incremental variables 70 and 111, respectively. Each of summing devices 87 and 88 performs the function of receiving a plurality of binary variables as inputs and providing an incrementally variable output which is the algebraic sum of the magnitudes represented by the input variables. Incremental variable 111 branches to energize output 71 of sub-system 68 and input 112 of stabilizing device 89. The output 90 of stabilizing device 89 joins sub-system input 69 to energize incremental variable 91, which is the input to amplifier 85. Incremental output 92 of amplifier 95 is the input of detector 86. Binary variables 93 and 94 are the outputs of detector 86 and provide the magnitude change demand inputs to module 79.

Stabilizing device 89 might be called a differentiator of the analog type because it functions to provide an incrementally variable output which is approximately proportional to the rate of change of its input. This output, reference number 90, modifies the magnitude of input 91 of amplifier 85 during any change in the magnitude of the variables 102, 103 and 104. This action enhances the stability of any system in which the sub-system 68 is employed. As soon as magnitude changes subside in variables 102, 103 and 104 the incremental variable 90 becomes approximately zero, so that during quiescence it does not contribute to the magnitude of incremental variables 69 or 91.

Reference number 85 indicates an ordinary amplifier, the output of which drives detector 86. Detector 86 is designed so as to provide the following performance features:

When the magnitude of incremental variable 92 is midrange, binary variables 93 and 94 are both driven to their ZERO states.

When the magnitude of incremental variable 92 is more than midrange, binary variable 93 is ONE, and 94 is ZERO.

When the magnitude of variable 92 is less than midrange, binary variable 93 is ZERO, and 94 is ONE.

In the preferred selection of operating values and adjustments a magnitude of approximately zero appearing at input 69 of sub-system 68 will produce and maintain a condition of quiescence in the magnitudes of the variables within the sub-system. During any such period of quiescence, the binary variables 113, 114 and 115 will have assumed one of the combinations available by the permutations of all of their values between the magnitudes of zero and one. While any such value remains manifested within this array of lines 113, 114, and 115, its value is presented in decimal digital form at outputs 74 to 78, inclusive.

An example of the performance of sub-system 68 is the change of magnitude of input 69 after a period of quiescence. If the change is in the sense of more magnitude for incremental variable 69 imposed upon it from a source outside FIG. 4, amplifier 85 and detector 86 will immediately manifest a demand for MORE magnitude. This demand appears as a ONE in magnitude of binary variable 93, while 94 remains in its ZERO state. As long as the demand for MORE remains applied to input 69, the modules 79, 80 and 81 will change more of their LATCHES to the LATCHED state, and if the MORE demand is applied still longer, all of the LATCHES will have assumed their LATCHED state and produce an indication of unsatisfied demand by causing output 72 to assume its ONE state.

A sufficient reduction in the magnitude of input 69 will produce a demand for LESS; and a similar and opposite series of events will occur, resulting in the UNLATCHing of the LATCHES, and a demand for LESS appearing as a binary ONE at 73 and a binary ZERO at 72. It is a fundamental property of my invention that any one of all of the possible combinations of binary states of variables 112, 114 and 115 can be effected, starting at any of the other combinations, by the sequence and duration of demand signals applied to input 69. In the course of any such sequence of operation, the lowest numbered element not already in the desired state will be the next to change state.

*Translator*

FIG. 5 discloses a translator employing electronic and electromechanical components to translate input binary variables 147 to 158, inclusive, 171 and 172 into output binary variables ZERO, ONE, TWO, THREE, FOUR, FIVE, SIX, SEVEN, EIGHT, NINE, 159 and 160. Armatures 123, 124, 125, and 126 are actuated by relay magnets 119, 120, 121, and 122, respectively, and are the actuating means for electrical contact clusters 127 to 131, 132 to 134, 135 to 138, and 139 to 142, respectively.

Adder modules 116, 117 and 118 are identical with each other, except that NOR element 166, corresponding to NOR elements 162 and 164 in adder modules 116 and 117, is omitted from adder module 118. The description of adder module 116 which follows will therefore also serve as a description of modules 117 and 118 when transliteration of corresponding elements and reference numerals is made. The binary variables 171, 172, 147, 148, 149 and 150 are inputs to adder module 116, and these inputs are assigned symbolic logic letters U, $\bar{U}$, A, $\bar{A}$, B, and $\bar{B}$, respectively. The outputs of module 116 are binary variables 167, 168, and 143. Expressions in symbolic logic terms of inputs for the various outputs of the NOR elements within module 116 pertain by reason of the particular interconnection of those elements with each other and with the inputs, and are listed in the following table:

| Reference number of NOR element supplying binary variable | Expression in symbolic logic for the binary variable |
|---|---|
| 176 | $\bar{U}\,\bar{B}$ |
| 177 | $\bar{U}\,\bar{A}$ |
| 178 | $\bar{A}\,\bar{B}$ |
| 179 | $\bar{U}\,\bar{A}\,\bar{B}$ |
| 180 | $\bar{U}\,A\,B$ |
| 181 | $U\,\bar{A}\,B$ |
| 182 | $\bar{U}\,A\,\bar{B}$ |
| 161 | $\bar{U}\,\bar{B}+U\,\bar{A}+\bar{A}\,B$ |
| 162 | $\bar{U}\,B+\bar{U}\,\bar{A}+\bar{A}\,\bar{B}$ |
| 173 | $\bar{U}\,\bar{A}\,\bar{B}+\bar{U}\,A\,B+U\,\bar{A}\,B+U\,A\,\bar{B}$ |

The expressions in symbolic logic listed above, each represent only one form in which each of these expressions may be written. Other forms are derived by the application of the various formal theorems of symbolic logic. The outputs of module 116 feed inputs to module 117 and provide the binary variable 143 to dictate the state of actuator 123 by way of magnet 119. The outputs of module 117 feed inputs to module 118 and provide the binary variable 144 to dictate the binary state of actuator 124 by way of magnet 120. The outputs of module 118 provide the binary variables to dictate the states of actuators 125 and 126 by way of their respective magnets 121 and 122 through variables 145 and 146, respectively.

It is a property of the circuitry of FIG. 5 functioning as a translator that one and only one of the outputs ZERO to NINE, inclusive, can assume its ONE state at any given time, and that all of the others of these outputs must assume their ZERO states at that time. This is effected by reason of the following features of my circuit design in the interconnection of the contact clusters 127 to 142, inclusive:

| States of actuators | | | | | Path to ground to provide ONE state for output designated | |
|---|---|---|---|---|---|---|
| Value assigned | 1 | 2 | 4 | 8 | Output | Reference numbers of contact clusters in path |
| Reference No. | 123 | 124 | 125 | 126 | | |
| | 0 | 0 | 0 | 0 | ZERO | 127, 133, 132, 139 |
| | 1 | 0 | 0 | 0 | ONE | 127, 133, 132, 139 |
| | 0 | 1 | 0 | 0 | TWO | 129, 136, 141, 133 |
| | 1 | 1 | 0 | 0 | THREE | 129, 136, 141, 133 |
| | 0 | 0 | 1 | 0 | FOUR | 128, 135, 132, 139 |
| | 1 | 0 | 1 | 0 | FIVE | 128, 135, 132, 139 |
| | 0 | 1 | 1 | 0 | SIX | 130, 136, 141, 133 |
| | 1 | 1 | 1 | 0 | SEVEN | 130, 136, 141, 133 |
| | 0 | 0 | 0 | 1 | EIGHT | 131, 134, 138, 142 |
| | 1 | 0 | 0 | 1 | NINE | 131, 134, 138, 142 |
| | 0 | 1 | 0 | 1 | ZERO | 127, 133, 132, 139 |
| | 1 | 1 | 0 | 1 | ONE | 127, 133, 132, 139 |
| | 0 | 0 | 1 | 1 | TWO | 129, 136, 141, 133 |
| | 1 | 0 | 1 | 1 | THREE | 129, 136, 141, 133 |
| | 0 | 1 | 1 | 1 | FOUR | 128, 135, 132, 139 |
| | 1 | 1 | 1 | 1 | FIVE | 128, 135, 132, 139 |

It is a further essential property of the translator of FIG. 5 that CARRY output 159 finds its path to ground sometimes thru contact cluster 134, but both of contact clusters 138 and 142 must be found in their ONE states in order for CARRY output to assume its ONE state. The NOT CARRY output 160 may be energized to its ONE state either thru cluster 142 alone, or by way of an alternate path thru clusters 137 and 133.

In the preferred embodiment of my invention, zero value is assigned the ONE states of certain of the binary variables; and other values are assigned to the ONE states of other variables, as disclosed in the following table:

| Reference number of binary variable | Magnitude value assigned |
|---|---|
| 171 | 1 |
| 172 | 0 |
| 147 | 1 |
| 148 | 0 |
| 149 | 1 |
| 150 | 0 |
| 151 | 2 |
| 152 | 0 |
| 153 | 2 |
| 154 | 0 |
| 155 | 4 |
| 156 | 0 |
| 157 | 4 |
| 158 | 0 |
| Each of 143, 119, 123, 127, 128, 129, 130, 131 | 1 |
| Each of 144, 120, 124, 132, 133, 134 | 2 |
| Each of 145, 121, 125, 135, 136, 137, 138 | 4 |
| Each of 146, 122, 126, 139, 140, 141, 142 | 8 |
| 159 | 0 |
| 160 | 10 |

The whole translator of FIG. 5, with this array of values assigned, functions to add the values assigned to the inputs in their ONE states and cause the sum of the values thus registered to produce the ONE state in one or the other of outputs 159 or 160, and at the same time energize one and only one of the outputs ZERO to NINE. The particular outputs assuming the ONE state will have the same total value represented by the sum of the inputs in their ONE states.

*Measuring system*

FIG. 6 shows a block outline 183 to indicate a least-next sub-system identical to item 68 in FIG. 4 associated with other devices to constitute a measuring system. The other devices are summing element 184, NOR operator 185, incrementally variable indicator 186, and decimal display units 187 to 190, inclusive. The independent incremental variable being measured is presented to the measuring system as input 191, and another incrementally variable input is presented at 192. The indication of the magnitude of the measured value appears as a position of the pointer of indicator 186 on its graduated scale; and the measured magnitude also appears in decimal digits at digital display devices 187 to 190, inclusive. Output 193 of 185 supplies illumination energy for the display 187 to 190, inclusive. The demand signals 194 are an output of sub-system 183 and the inputs to NOR operator 185. Incrementally variable output 196 of sub-system 183 is the driving means, that is, the input, to indicator 186. Decimal outputs 197 and 198 are like outputs 74 to 78, inclusive from sub-system 68 in FIG. 4 and are inputs of the display devices. Incremental variable 200 is the output of summing device 184 and the input to sub-system 183. Incremental variable 199, the feedback output from sub-system 183, enters summing device 184 as one of its three inputs.

One mode of operation of the measuring system of FIG. 6 is to disconnect incremental variable 192, or to set and maintain its magnitude at zero. In this mode of operation the feedback variable 199 will automatically be changed in magnitude by the follow-up action of the measuring system so as to seek the same magnitude as that of independent variable 191, but the opposite sense. As soon as this condition of equal magnitude and opposite sense has been satisfied the output 200 will become approximately zero; and since it is connected directly to input 69 of sub-system 68 of FIG. 4, will drive the sub-system to quiescence. In accordance with the features of my invention feed-forward output 196 is substantially equal to feed-back 199, and is equal in magnitude and opposite in sense to input 191 under the condition of zero assumed for input 192. The magnitude of 196 is indicated by 186, and thus the indication of magnitude on the face of indicator 186 becomes the useful incremental value for measured input 191 available for observation by the human attendant. By reason of the normal functioning of sub-system 183 in driving decimal indicators 187 to 190 through lines 197 and 198, the numerals displayed as decimal digits represent the numerical value of the measured input 191.

Whenever the magnitude of 191 exceeds the magnitude capacity of sub-system 183, a demand signal represented by the ONE state will appear on one or the other of lines 194. NOR operator 185 will then function to cause the ZERO state to appear on its output 193, and so extinguish the illumination in displays 187 to 190, so that their numerals cannot be observed. For values of measured input 191 within the capacity of the measuring system in FIG. 6, both of the lines 194 will find their ZERO states, and NOR 185 will furnish a ONE signal on line 193 to render visible the numerals in display 187 to 190.

The action of summation device 184 is such that the sum of incremental variables 191 and 192 is equal and opposite to the magnitude of incremental variable 199, which has the same magnitude as that represented by the digits in 187 to 190. In the two paragraphs of description just preceding this paragraph, the value of 192 was stipulated to be zero, so that 199 was forced by the operation of the measuring system to be equal and opposite to 191. For other values of 192, the numerical value displayed at 187 to 190 during quiescence of the system is substantially equal to the sum of the incremental magnitudes of the algabraic sum of the magnitudes of inputs 191 and 192. It is also a feature of my invention that more than two incremental variables can be presented for summation at summation device 184.

*Computing system*

An important feature of my invention is the combination of the least-next sub-system with controllers and summing devices to accomplish algebraic addition, multiplication, and division in the manner of a differential computer. FIG. 7 discloses a preferred embodiment of my computer and illustrates in block diagram manner two least-next sub-systems 201 and 202 associated with summing devices 203 and 204 and controllers 205 and 206. Incremental variables 207 to 210 are the inputs to the computer; line groups 211 and 212 are its digital outputs; line 213 is its incrementally variable output; and line pairs 214 and 215 are its binary indications of validity (or invalidity) for the other outputs. Outputs 214 and 215 may be ignored or connected to indicators as required by the attendants of the computer. Incremental output 213 is the principal incremental output; and digital outputs 211 and 212 are the digital outputs. Incremental variables and their respective functions are: 216 is output from controller 205 and input to summing device 203; 217 is output from controller 206 and input to summing device 204; 218 is feedback from sub-system 201 to controller 205; 219 is feedback from sub-system 202 to summing device 217; 220 is output from summing device 203 and input to sub-system 201; 221 is feed-forward from sub-system 201 to controller 206; 222 is output from summing device 204 and input to sub-system 202.

It is an advantage of my invention that the incremental inputs to my computer can be introduced as inputs to the various elements, devices, and sub-systems within the computer to achieve a variety of computing arrangements. In the preferred embodiment of my invention illustrated in FIG. 7, the incremental inputs are introduced as inputs to the controllers and summing devices as follows: 207 to 206; 208 to 205; 209 to 203; 210 to 204.

The summing devices 203 and 204 are of the kind which accepts a plurality of incremental input variables and produces an incremental output variable the magnitude of which is the algebraic sum of the magnitudes of the inputs.

Controllers 205 and 206 are of the kind which accepts two incremental inputs and produces an incremental output whose magnitude is the product of the magnitudes of the two incremental inputs.

In normal operation of the computer system shown in FIG. 7, each of the incremental variables 207 to 210 may assume any value, as independent variables, within the range of magnitudes for which the system is engineered. During the changes of magnitude of these inputs, the sub-systems 201 and 202 will automatically try to follow the changes, and will continually approach an automatically computed solution of the equation for which it is engineered. As soon as the inputs stop changing in magnitude, the computer will quickly drive itself to quiescence and provide an accurate computation of the useful output magnitudes. The most useful output of FIG. 7 computer is 213, designated "y." The equation mechanized in FIG. 7 is $y=xz/w+v$ which expression and others mechanized within my computer are given in the following table:

| Reference numeral of variable | Kind of variable | Expression for magnitude in terms of magnitudes of inputs |
|---|---|---|
| 207 | incremental | $z$ |
| 208 | incremental | $w$ |
| 209 | incremental | $x$ |
| 210 | incremental | $v$ |
| 211 | decimal digital | $\frac{x}{w}$ |
| 212 | decimal digital | $y=\frac{xz+v}{w}$ |
| 213 | incremental | $y=\frac{xz+v}{w}$ |
| 216 | incremental | $x$ |
| 217 | incremental | $\frac{xz}{w}$ |
| 218 | incremental | $\frac{x}{w}$ |
| 219 | incremental | $\frac{xz+v}{w}$ |
| 220 | incremental | 0 |
| 221 | incremental | $\frac{x}{w}$ |
| 222 | incremental | 0 |

The above listed expressions are valid only during periods of quiescence during the automatic operation of the computer.

*Electronic least-next module*

When my invention is engineered for the use of electronic components the preferred interconnection of the electronic logical operators is that illustrated in symbolic logic diagram FIG. 8. The electronic least-next module thus provided as an embodiment of my invention is to be employed, when duplicated in sufficient quantity, as the least-next modules 79, 80 and 81 in subsystem block diagram FIG. 4. In understanding the operation of electronic least-next module of FIG. 8, it is to be noted that FIG. 8 inputs and outputs serve the same functions as the corresponding lines in FIG. 3, and that the least-next module description under the heading "The least-next module" dealing with FIG. 3 also applies to FIG. 8 insofar as it deals with over-all performance of the module and the input and output lines. This interchangeability of FIGS. 3 and 8 is made clear by the following table when it is compared with the table given in the preceding description for FIG. 3:

| Reference numeral in Fig. 8 | Expression in symbolic logic | Reference numeral in Fig. 8 | Expression in symbolic logic |
|---|---|---|---|
| 223 | $M\,\bar{L}$ | 224 | $\bar{M}\,L$ |
| 257 | $A\,M\,\bar{L}$ | 258 | $\bar{A}\,\bar{M}\,L$ |
| 259 | $A\,B\,M\,\bar{L}$ | 260 | $\bar{A}\,\bar{B}\,\bar{M}\,L$ |
| 261 | $A\,B\,C\,M\,\bar{L}$ | 262 | $\bar{A}\,\bar{B}\,\bar{C}\,\bar{M}\,L$ |
| 263 | $A\,B\,C\,D\,M\,\bar{L}$ | 264 | $\bar{A}\,\bar{B}\,\bar{C}\,\bar{D}\,\bar{M}\,L$ |
| 265 | $A\,B\,C\,D\,E\,M\,\bar{L}$ | 266 | $\bar{A}\,\bar{B}\,\bar{C}\,\bar{D}\,\bar{E}\,\bar{M}\,L$ |
| 225 | $A\,B\,C\,D\,E\,F\,M\,\bar{L}$ | 226 | $\bar{A}\,\bar{B}\,\bar{C}\,\bar{D}\,\bar{E}\,\bar{F}\,\bar{M}\,L$ |
| 251, 227, 239 | $A$ | 228 | $\bar{A}$ |
| 252, 229, 240 | $B$ | 230 | $\bar{B}$ |
| 253, 231, 241 | $C$ | 232 | $\bar{C}$ |
| 254, 233, 242 | $D$ | 234 | $\bar{D}$ |
| 255, 235, 243 | $E$ | 236 | $\bar{E}$ |
| 256, 237, 244 | $F$ | 238 | $\bar{F}$ |

The electronic operators in FIG. 8 are NOR operators 253 to 266, inclusive, and LATCHES 247 to 252, inclusive. It is a fundamental feature of my invention not only that the lowest-numbered of the binary outputs available for change in the sense demanded, but that only one pair of binary output variables changes state at a time. In FIG. 8 this feature is made possible by the slight inherent time delay in the change of state of any of the NORs or LATCHes after the arrival at their input terminals of the variable magnitudes producing the change of state. Such delays permit time in automatic operation of other parts of the system in which the least-next module is used for the determination of the suitability of the combination of binary outputs from FIG. 8, and the subsequent application or suppression of the demand signals at inputs 223 and 224.

*Electro-mechanical least-next element*

A preferred electro-mechanical embodiment of my invention, useful in engineering applications using electromagnetic devices of the relay kind, and adapted to accomplish the functions of logic element 7 in FIG. 2, is shown as element 279 in FIG. 9. It will be noted in comparing FIG. 9 with FIG. 2 that the expressions in symbolic logic for the binary variables which are the inputs and outputs of FIG. 9 are the same as those for variables performing like functions in FIG. 2. Element 279 can, therefore, be used interchangeably with any of those least-next elements designated by reference numerals 45 to 50, inclusive of FIG. 3.

In FIG. 9, lines 280 to 287, inclusive, 296 and 297 are conductors of electricity, and are used to represent binary variables in the following manner: Positive voltage connected by way of ground represents the ONE state; and a negative potential represents the ZERO state. The state of ZERO is illustrated in FIG. 9 for armature 289 actuator 290, contact clusters 291, 292, and 293. Whenever conductor 296 is energized by positive voltage connection to ground, magnet 288 becomes energized and pulls referenced items 289 to 293, inclusive, to their ONE states. Catch 295 is momentarily pushed aside by the upward movement of armature 289; but it quickly swings back into the position illustrated to latch armature 289 and its associated contact clusters into their ONE states. Electric current in conductor 297 will flow through magnet 294 to energize it whenever conductor 281 is driven to its ONE state and pull catch 295 to the left so as to release armature 289. If magnet 288 is de-energized during the time catch 295 is thus pulled aside, armature 289 and its associated contact clusters will drop back to the positions illustrated in FIG. 9.

Although there is not an item-for-item correspondence between FIGURES 9 and 2, there is a functional correspondence between the figures as follows:

| Fig. 9 items | Items in Fig. 2 performing the same function |
|---|---|
| Inductance of electromagnet 288 | Delay 9 |
| Inductance of electromagnet 294 | Delay 10 |
| Electromagnets 288, 294; armature 239; actuator 290; catch 295; and contact cluster 291. | LATCH 8 |
| Normally-open contact cluster 292 | AND 11 |
| Normally-closed contact cluster 293 | AND 12 |

The electro-mechanical logical least-next unit of FIG. 9 comprises: a latching component, comprising a magnet 288 and its armature 289; an unlatching component, comprising magnet 294 and its armature 295, which is yieldably urged to catch armature 289 whenever a strong pulse of current in magnet 288 draws armature 289 oppositely from the direction toward which it is yieldingly urged, whereby the armature 295 can unlatch whenever a strong pulse of current in magnet 294 draws armature 295 toward it; switching means 291 permit the switching to either of two alternate positions in response to the status of the latch, the switching means and the armature 289 being operatively connected so that each is yieldingly urged toward the unlatched status; a battery in FIG. 9 symbolizes a souce of electrical energy, the ground connection for which may be transmitted to either outlet 286 or 287 in response to the status of the latch; one side of the battery is connected to each of the magnets 288 and 294; the impedance of the magnet 288 acts as delaying means for the latching component, and the impedance of the magnet 294 serves as the delaying means for the unlatching component; a latching input conductor 280 is associated with wiring means 284 going to the switching means 291, and thus by-passes the delaying means; an unlatching input conductor 281 is associated with wiring means 285 going to the switching means 291, and thus by-passes the delaying means; the latching input conductor 280 is associated with the latching component through its delay means, the inductance of the magnet 288; the unlatching input conductor 281 is associated with the unlatching component through its delay means, the inductance of the magnet 294; whereby the delayed signal from 281 unlatches the latch and maintains the latch unlatched (as shown in FIG. 9) until a delayed signal from 280 exceeds the predetermined magnitude necessary for magnet 288 to attract armature 289 to latch the latch and shift the status of the switching means 290. FIG. 9 shows contact clusters 291, 292, and 293 but the switching means can also include additional clusters for inserting or withdrawing values into a balancing circuit for measuring a signal. Thus, the output signal leaving the logical least-next unit 279 can differ from the input signal. A series of logical least-next units can thereby insert resistances into an arm or a bridge to automatically find the null point, and when an oversize value is thus automatically affected, there is an automatic return of the searching for the null value at the first of the series of the logical least-next units.

*Fluid-flow-type least-next elements*

FIG. 10 discloses least-next logic elements 298, 299, and 300 constructed in accordance with the preferred embodiment of my invention when it is engineered for operation by fluid flow. The fluids employed may be either liquid or gaseous. Least-next elements 298, 299, and 300 perform the functions represented in FIG. 3 by elements 45, 46, and 47, respectively; and the corresponding elements are represented by like characters of symbolic logic, namely: A, B, and C. Each of the elements 298, 299, and 300 is represented by the logic diagram for element 7 in FIG. 2. Although characterized by fluid flow, the least-next elements illustrated in items 298, 299, and 300 in FIG. 10 include mechanical and electrical features as essential parts of the invention. Electrical contact clusters 331, 332, and 333 serve as sources for binary output signals which are of the electrical kind; and lines 305 to 310, inclusive, represent electrical conductors. Dotted lines 328, 329, and 330 represent mechanical members which drive contact clusters 331, 332, and 333, respectively to one or the other of their respective binary states. These mechanical members are in turn driven by pins 334, 335, and 336, respectively; which pins are secured in rotors 323, 325, and 327, respectively. The last-mentioned rotors rotate on shafts 319, 320, and 321, respectively; but are restricted in rotation to approximately 120 degrees of angular displacement from one extreme of their respective limits to the other extreme. Rotor 323 is illustrated in FIG. 10 in the clockwise extreme of its limits of rotation; and rotors 325 and 327 are shown in the figure in their respective counterclockwise extremes. Items 322, 324, and 326 are cylindrically-shaped rollers free to rotate on their respective shafts which are secured to and positioned by the rotors as shown in FIG. 10.

Members 317 and 318 are flexible, resilient, elastic tubes which extend through the successive least-next elements 298, 299, and 300. Supports 311 to 316, inclusive, hold the tubing in position; and are cemented to the tubing surface at the surface of contact between support and tube. Lower roller 322 is shown in FIG. 10 pressing on tube 318 to a degree which flattens it and prevents the flow of fluid through that tube at element 298 so long as it remains in the position shown; while uppermost roller 322 is shown clear of tube 317 so that fluid is free to flow in that tube through element 298. The illustration thus portrays the ONE state for element 298, and the ZERO state for both of elements 299 and 300.

Line 301 represents the direction of flow of fluid signifying the state ONE for the fluid input $M\overline{L}$ of element 298; and line 302 represents the ONE state of $\overline{ML}$ input for the same element. Lines 303 and 304 represent binary variables of fluid kind, $ABCM\overline{L}$ and $\overline{A}\,\overline{B}\,\overline{C}\,\overline{M}\,L$, respectively. The rotors and the rollers they carry are so related in position and dimension to the parts of the tubing they touch and to their respective supporting structures, which also hold shafts 319, 320, 321, and to supports 311 to 316, inclusive; that when one of them is rotated to a position approximately midway in its rotary travel it will constrict to close both of its tubes. According to my invention, the fluid portion of each of the least-next elements 298, 299, and 300 is in effect two pinch-type valves having a common actuating member, rotors 323, 325, and 327, respectively. The pressure of fluid flow in one or the other of the tubes 317 or 318 forces its way through the next pinch valve in its path, and thereby closes the other valve in the same least-next element.

A typical operating sequence for fluid-flow-type least-next elements may be perceived by considering FIG. 10 as representing a quiescent condition prevailing for three such elements 298, 299, and 300; in which condition inputs 301 and 302 will be in their ZERO states, that is, the fluid flow in both of tubes 317 and 318 will have subsided to zero, and the pressures in them will be negligibly small. In the illustration, output 305 is in its ONE state; 306, ZERO; 307, ZERO; 308, ONE; 309, ZERO; and 310, ONE. A fluid flow initiated at 301 into tube 317 will pass through element 298 without causing a change in state of any binary variable, and will cause a pressure increase in tube 317 in the zone where it is constricted between upper roller 324 and support 313. At the first moments of the duration of pressure increase, an expansion of the tube 317 against the face of upper roller 324 will cause only a slight clockwise rotation of rotor 325; and if the flow 301 ceases, thus allowing the pressure to subside, the rotor 325 and its rollers 324 will retain approximately the positions illustrated for them in FIG. 10. If, however, the flow and pressure are sustained, the force of the expanding wall of tube 317 against upper roller 324 will move rotor 325 approximately 120 degrees clockwise; and in the course of that rotary travel, lower roller 324 will squeeze tube 318 between its surface and the concave surface of support 314 and will also move the shaft of upper roller 324 far enough in a clockwise rotary path to clear the constriction of tube 317 at the zone of its passage through element 299. Another result of the clockwise rotation of rotor 325 is to move the pole of contact cluster 332 from the normally closed position illustrated to strike the other of its contacts. The result of the foregoing sequence of events is the change of element 299 to its ONE state.

In a manner similar to that just described, the cessation of flow at 301 and the application of flow at 302 will cause a counter-clockwise rotation of rotor 323 to effect a change to ZERO state by element 298.

The expressions in the notation of symbolic logic for the binary fluid variables 303 and 304 are exactly the same as the expressions for the respective variables 61 and 62 in FIG. 3, namely: the expression for 303 is $ABCM\overline{L}$, and the expression for 304 is $\overline{A}\ \overline{B}\ \overline{C}\ \overline{M}\ L$.

It is a feature of my invention that fluid readout of the binary states of the elements 298, 299, and 300 can be obtained by puncturing tubes 317 and 318 at points along their length between the elements, and securing other tubing extensions by sealing their ends around the punctures as conduit extensions to convey fluid flow to comprise binary output variables of the fluid kind. However, in the preferred embodiment of my invention, the fluid-type least-next binary elements are equipped with electrical contact clusters, as illustrated in FIG. 10.

*Mechanical type least-next elements*

FIG. 11 discloses least-next logic elements 338, 339, and 340 constructed for operation by mechanical means and adapted to furnish binary variables of mechanical kind as outputs. FIGURES 12 and 13 are partial sectional views of element 339 taken on lines 12—12 and 13—13, respectively. Least-next elements 338, 339, and 340 perform the functions represented in FIG. 3 by elements 45, 46, 47, respectively; and the corresponding elements are represented by like characters of symbolic logic, namely: A, B, and C. Each of the elements 338, 339, and 340 is represented by the logic diagram for element 7 in FIG. 2. Although characterized by its mechanical mode of operation the least-next elements illustrated in items 338, 339, and 340 in FIG. 11 include features which are essential parts of my invention. The expression in the notation of symbolic logic for the binary variables of mechanical kind in FIGURES 11 and 12 are exactly the same as the expressions for corresponding logical operators in FIGURES 2 and 3.

Output variables are mechanical members 351, 352, and 353, illustrated in FIG. 11 and clarified in FIGURES 12 and 13. They can have useful output mechanical loads attached to their upper end, and serve as outputs for elements 338, 339, and 340, respectively. Pins 354, 355, and 356, securely attached to members 351, 352 and 353 respectively; each serves the dual function of restricting the rotary motion of its supporting member and of actuating its brake band tensioners. The brake band tensioners are indicated by reference numerals 357 to 362 inclusive. FIG. 12 illustrates the two binary states of binary variable 352, which is the mechanical member serving as an output for element 339; and the description for the operation and positions of member 352 can be taken as describing like members 351 and 353 in elements 338 and 340, respectively. The dotted outline for member 352 denotes its ONE state, symbolized by line 379; and the solid outline for 352 in FIG. 12 denotes its ZERO state, symbolized by line 380.

The demand outputs from elements 338, 339, and 340 are transmitted by rotary motion of shafts 348, 349, and 350, respectively; and the input to element 338 is transmitted by means of rotary motion of shaft 347. For each of these shafts, the ONE state for one of a pair of variables is one direction of rotation; the ONE state for the other variable is the other direction of rotation; and the ZERO states for both of the variables is denoted by no motion of the shaft.

Rod 375 is rigidly supported to the frameworks base and serves as a limiter of rotary motion for band tensioners 357 to 362 inclusive. One end of each of bands 363, 364, and 365 is securely attached to the upper end of one band tensioners 378, 358, and 359, respectively; and the other end of each band is securely fastened to one of tensioners 360, 361, and 362. Tension spring 385 provides force transmitted through tensioners 361 and 358 to maintain tension on band 364, so that the rotary motion of drum 373 is restricted. The tension springs, such as 385 in FIG. 13, although not shown in FIG. 11, can be understood to function.

Bevel gears 368, 369, and 377 cooperate in the manner of an ordinary differential mechanism; and 377 is the planetary gear therein. The bearing shaft of the planetary gear 377 is mounted on the end of member 352 as an extension of the long axis of that member. A shaft through member 352 is its rotary pivot; and the center of rotation for member 352 is the same as the center of rotation for the differentials. Elements 338 and 340 include differentials having components similar to those described for element 339. Further description for the operation of element 339, illustrated in FIGURES 11, 12, and 13, also applies to the operation of elements 338 and 340, provided a proper transliteration of reference numerals is made.

In the state of quiescence, slight rotary oscillations of shaft 348 and the resulting slight rotary oscillations of the gears and other members driven by it does not cause any change of state, but is taken as an acceptable noise level. If, for example, the ONE state is imposed upon shaft 458 and the bevel gear 368 driven by it by reason of persisting rotation in the appropriate direction, the differential action of the bevel gears will cause member 352 to be driven in rotation to its ONE position. This is accomplished by reason of the restraint applied to drum 373 by band 364 to prevent it from rotating while member 352 is in the course of its rotation from one state to another. If rotation is continued at shaft 348, pin 355 will be driven into contact with tensioner 361, and still further rotation will cause the whole assembly of tensioners, band, and brake drum to rotate slightly until stopped by contact of tensioner 358 with rod 375. Rotation in the same direction persisting after contact with rod 375 forces spring 385 into elongation and so releases tension on band 364. Further rotation will produce output rotation of shaft 349 in its ONE direction. As soon as that rotation is stopped by the cessation of rotation by shaft 348, the force of spring 385 will re-apply the braking friction of band 364 to drum 373, so that the element is prepared for the next sequence of operation.

Those skilled in the art can recognize that a series of least-next mechanical units such as shown in FIGURES 11, 12, and 13 might include many more than three such units, and might be employed in any of a variety of situations. Each output mechanical member can be adapted to lift a weight when the initial input is clockwise while being transformed to the ONE state. Each succeeding unit of the series can lift a heavier weight. When used as a guage for measuring torque, the series of increasingly heavy weights are lifted until the existing torque is measured, after which the quiescent state is achieved. A subsequent increase or decrease in torque permits the measurement of the increment by the operation of the series of least-next units. Although the various torque magnitudes are of an analog type, the measurement thereof through the least-next units also accomplishes the translation into digital data. Slight oscillations of the magnitude of the torque serve merely as background noise without initiating the change of state of any of the series of least-next units. For reasons such as those discussed, the series of least-next units can control the operation of a servomechanism with a highly advantageous combination of relatively inexpensive equipment, speed of operation, and stability of operation.

Numerous modifications of the invention are possible without departing from the inventive concepts set forth herein. Because the invention is believed to be an important forward advance useful in a great variety of methods and apparatus, the broad generalizations are believed to be more satisfactory than a description of a few methods or devices incorporating some of the features of the invention. The invention has practical applications, and is not a mathematical exercise. Supplemental descriptions of specific methods and/or devices utilizing features of the invention can be imagined by the technician subsequent to a study of the description herein. Only those limitations set forth in the claims herein are intended to restrict the scope of the invention, the detailed description and drawings providing merely the illustrative embodiments of the invention.

The invention claimed is:

1. Electrical apparatus having logic circuits characterized by an interconnected series of logical least-next units, each logical least-next unit comprising a pair of electrical latch components related to each other as an electrical latch, one of said latch components being a latching component and the other of said components being an unlatching component; switching means shiftable between alternative positions corresponding to a latched and unlatched condition of the electrical latch; means associating the switching means and the electrical latch whereby the switching means is responsive to the condition of the electrical latch; a source of electrical energy associated with each of said electrical latch components; an electrical delay means associated with each of the electrical latch components; latching input conductors associated with the latching component through its delay means, whereby the delayed signal from the latching input conductors can shift the latch from unlatched condition to latched condition when such delayed signal exceeds a predetermined magnitude for a longer than a predetermined duration and whereby the latch is maintained in latched condition until a signal actuates the unlatching component; an unlatching input conductor associated with the unlatching component through its delay means, whereby the delayed signal from said unlatching input conductor can shift the latch from latched condition to unlatched condition when such delayed signal exceeds a predetermined magnitude for longer than a predetermined duration and whereby the latch is maintained in unlatched condition until a signal actuates the latching component; a plurality of output conductors, wiring means transmitting each input signal to said switching means; wiring means connecting the switching means with output conductors, whereby input signals advance to a particular signal output contingent upon the condition of the electrical latch; and selected ones of said output conductors being connected to said input conductors of the next logical least-next unit, and other selected ones of said output conductors insertable or withdrawable from logic circuits by the switching means of each of said logical least-next units.

References Cited

UNITED STATES PATENTS

| | | | |
|---|---|---|---|
| 3,100,294 | 8/1963 | Dryden | 317—140 |
| 3,163,247 | 12/1964 | Bell et al. | 177—3 |
| 3,211,991 | 10/1965 | Potter | 235—179 |
| 3,229,168 | 1/1966 | Jackel | 317—140 |
| 3,244,942 | 4/1966 | Deeg | 317—140 X |

MALCOLM A. MORRISON, *Primary Examiner.*

MARTIN P. HARTMAN, *Examiner.*

I. KESCHNER, *Assistant Examiner.*